(12) United States Patent
Proulx et al.

(10) Patent No.: US 10,178,213 B2
(45) Date of Patent: Jan. 8, 2019

(54) SYSTEM AND METHOD FOR DELIVERY AND PRESENTATION OF MESSAGES IN DEPENDENCE UPON THE MODE OF OPERATION OF THE COMMUNICATION DEVICE

(75) Inventors: David Rene Proulx, Waterloo (CA); Matthew Bells, Waterloo (CA); Alek Tziortzis, Palatine (IL); Sherryl Lee Lorraine Scott, Toronto (CA)

(73) Assignee: BlackBerry Limited, Waterloo (CA)

( * ) Notice: Subject to any disclaimer, the term of this patent is extended or adjusted under 35 U.S.C. 154(b) by 855 days.

(21) Appl. No.: 12/756,722

(22) Filed: Apr. 8, 2010

(65) Prior Publication Data

US 2011/0251899 A1 Oct. 13, 2011

(51) Int. Cl.
G06Q 30/00 (2012.01)
H04M 1/725 (2006.01)
G06Q 30/02 (2012.01)

(52) U.S. Cl.
CPC ........ H04M 1/72519 (2013.01); G06Q 30/02 (2013.01); G06Q 30/0267 (2013.01)

(58) Field of Classification Search
USPC .......................................................... 705/14
See application file for complete search history.

(56) References Cited

U.S. PATENT DOCUMENTS

| | | | | |
|---|---|---|---|---|
| 6,618,474 B1* | 9/2003 | Reese | ..................... | H04M 1/57 379/142.02 |
| 2004/0203890 A1* | 10/2004 | Karaoguz | ............. | H04W 48/16 455/456.1 |
| 2006/0038004 A1* | 2/2006 | Rielly | ................ | G06Q 20/1085 235/379 |
| 2006/0206379 A1* | 9/2006 | Rosenberg | ...................... | 705/14 |
| 2008/0074488 A1* | 3/2008 | Thompson | ................. | 348/14.08 |
| 2008/0108337 A1 | 5/2008 | Pomerantz | | |
| 2009/0029721 A1 | 1/2009 | Doraswamy | | |

(Continued)

FOREIGN PATENT DOCUMENTS

| | | |
|---|---|---|
| EP | 1477918 A2 | 11/2004 |
| WO | 01/47264 A2 | 6/2001 |
| WO | 03039038 A1 | 5/2003 |

OTHER PUBLICATIONS

Extended European Search Report issued by the European Patent Office dated Apr. 20, 2011 for corresponding European Patent Application No. 10182047.0.

(Continued)

*Primary Examiner* — Michael W Schmucker
(74) *Attorney, Agent, or Firm* — Moffat & Co

(57) ABSTRACT

A method and system for delivery and presentation of a message on a communication device. A detection of a connection of a call made by a communication device is detected at the communication device. A further detection that the communication device is operating in a pre-defined mode of operation is performed, a message accessibly stored in memory is accessed, and display or other presentation of the message is initiated on an interface such as a display screen of the communication device. The call connection status is monitored, and the message is presented at least while the call is connected and the device is operating in the pre-defined mode of operation.

21 Claims, 5 Drawing Sheets

(56) References Cited

U.S. PATENT DOCUMENTS

| | | | | |
|---|---|---|---|---|
| 2009/0037309 A1* | 2/2009 | Altberg | .................. | G06Q 40/00 |
| | | | | 705/35 |
| 2009/0136010 A1* | 5/2009 | Strietzel | ..................... | 379/88.25 |
| 2009/0185667 A1* | 7/2009 | Bychkov | ........... | H04M 1/72522 |
| | | | | 379/69 |
| 2010/0030643 A1* | 2/2010 | Sion | .......................... | 705/14.49 |
| 2010/0161430 A1* | 6/2010 | Mandel | ...................... | 705/14.73 |
| 2010/0182242 A1* | 7/2010 | Fields | ..................... | G06F 3/016 |
| | | | | 345/169 |
| 2010/0222027 A1* | 9/2010 | Scott | ...................... | G06Q 30/02 |
| | | | | 455/412.2 |

OTHER PUBLICATIONS

Mark Henrickson; "ThePudding: Targeted Advertising Comes to Phone Calls"; techcrunch.com website; http://techcrunch.com/2007/09/24/thepudding-targeted-advertising-comes-to-phone-calls/; Sep. 24, 2007.

AditOn Website; "How We Work"; retrieved through webarchive website; http://web.archive.org/web/20070703212540/www.aditon.com/ourBusiness.html; Jul. 2, 2007.

European Patent Office, Office Action for Application No. 10182047.0, dated Oct. 4, 2016.

European Patent Office, Office Action on Application No. 10182047.0, dated Jul. 23, 2012.

Canadian Intellectual Property Office, Office Action dated May 21, 2014 for Corresponding Canadian Patent Application No. 2,735,117.

Canadian Intellectual Property Office, Office Action dated Jul. 15, 2013 for Corresponding Canadian Patent Application No. 2,735,117.

* cited by examiner

SYSTEM AND METHOD FOR DELIVERY AND PRESENTATION OF MESSAGES IN DEPENDENCE UPON THE MODE OF OPERATION OF THE COMMUNICATION DEVICE

FIELD OF THE INVENTION

The present disclosure relates generally to a system and method for delivery and presentation of messages on a communication device and specifically to a system and method for delivering and presenting messages by monitoring the mode of operation of the communication device while a user is engaged in a telephone call on the communication device.

BACKGROUND OF THE INVENTION

With the proliferation of communication devices, communication providers are constantly looking for new ways and mediums to communicate their messages to a large number of users. It is also desirable for communication providers to find ways of communicating their messages such as to capture the attention of device users. Especially given the relatively widespread usage of handheld wireless devices, communication providers would be desirous of providing messages directed to such users.

BRIEF DESCRIPTION OF THE DRAWINGS

Embodiments are illustrated by way of example only and not limitation, with reference to the following drawings in which like reference numerals indicate corresponding or similar elements, and in which.

DETAILED DESCRIPTION OF THE PREFERRED EMBODIMENTS

Figure 1:
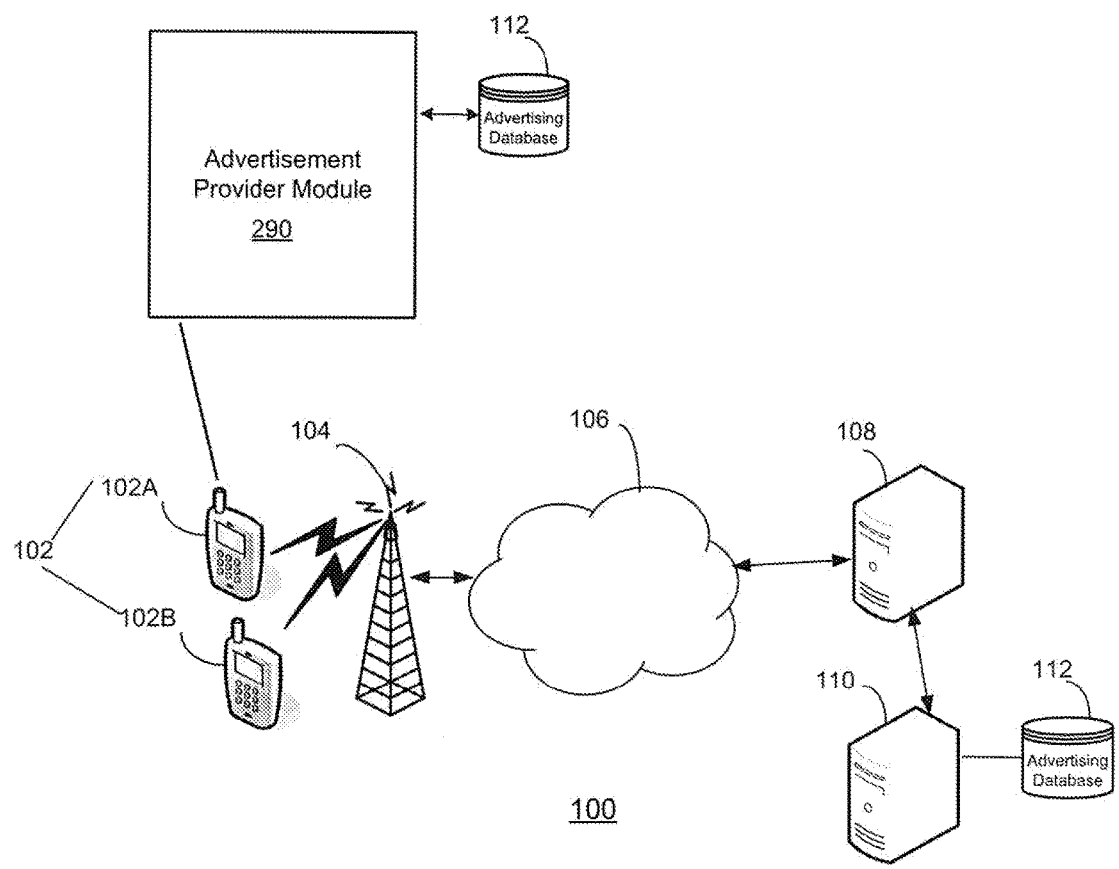
FIG. 1 is a block diagram illustrating a wireless communication system and a communication device which communicates within this system in accordance with one embodiment.

Accordingly, there is a need for providing messages in venues such as communication devices in such a way that users will be motivated to view the messages. Additionally, there is a need for presenting messages in communication devices by tailoring how or when the message is presented according to the context of use of the device. Especially if provided without regard to the degree of intrusiveness of the messages, users may be less likely to skip or ignore the messages. These messages can include for example advertisements, broadcast messages, user-specific messages, device-specific messages, communication provider specific messages. Other types of messages may also be envisaged as understood by a person skilled in the art. Since users generally do not appreciate intrusive messages, it is beneficial to provide messages to a user in a way that does not interfere with the user's conversation or interrupt the user's ability to place a call or perform other phone/communication device operations as desired. Additionally, it would be beneficial to allow a user to continue to use the device in the desired manner (i.e. taking a call hands-free or on a speaker) while being presented with the message(s).

In one aspect, there is computer implemented method for delivery and presentation of a message on a first communication device, the method comprising: receiving a call connection status indication associated with connecting a call between the first communication device and the second communication device; determining an occurrence of a pre-defined mode of operation of the first communication device during the call, the pre-defined mode of operation being selected from a list of modes comprising: a speaker phone mode of operation, a headset mode of operation, and a silent mode of operation; and, in dependence upon determining the occurrence of the pre-defined mode of operation, accessing the message stored in a memory and presenting the message on the first communication device during the call.

In another aspect, a computer program product storing instructions and data to configure a processor to perform the method is provided.

There is further provided a communication device for displaying a message, the communication device comprising: a processor and a memory coupled thereto, the memory storing instructions and data configuring the processor to perform the method.

In one embodiment, the communication device comprises a wireless communication device.

In one aspect, the list of modes further comprises a conference call mode of operation and determining the occurrence of the pre-defined mode of operation further comprises: receiving a conference call connection status indication associated with connecting the call with at least one other communication device; and presenting the message further comprises presenting a same message on each of the second communication device and said at least one other communication device in response to the conference call connection status indication.

In another aspect, the list of modes further comprises a conference call mode of operation and determining the occurrence of the pre-defined mode of operation further comprises: receiving a conference call connection status indication associated with connecting the call with at least one other communication device; accessing a plurality of messages stored in the memory, each of said plurality of messages pre-selected for presentation on a corresponding interface of each of the second communication device and said at least one other communication device; and presenting each of said plurality of messages on the corresponding interface in response to the received conference call connection status indication.

There is further provided a computer implemented system for delivering and presenting a message on a communication device, the system comprising: a call status monitor for receiving a call connection status indication associated with connecting a call between the first communication device and a second communication device; a device status monitor for determining an occurrence of a pre-defined mode of operation of the first communication device during the call, the pre-defined mode of operation of the first communication device being at least one of: a speaker phone mode of operation, a headset mode of operation, a silent mode of operation; and, a message presentation module configured to access the message from a memory location, and to initiate presentation of the message on the first communication device in dependence upon receiving the call connection status and determining the occurrence of the pre-defined mode of operation of the first communication device.

Referring to FIG. 1, a communication system is illustrated generally by numeral 100. The communication system 100 comprises a plurality of communication devices 102, a base station or antenna 104, a communication network 106, a carrier system 108, and an advertisement message provider module 290 having access to a message database 112. As will be described, the message provider module 290 is configured to provide messages for presentation on one or more of the communication devices 102 in dependence upon detecting an occurrence of a pre-defined mode of operation of the corresponding communication device. The messages may include any one of audio, video, text, or picture messages and combinations thereof. As will be described, in one embodiment, the messages are displayed on a display screen of the communication device 102. In another embodiment, the messages are heard on a speaker of the communication device 102. As will also be described, the pre-defined mode of operation of the communication device 102 comprises at least one of a speaker phone mode (use of an internal/external speaker to broadcast the call), a headset phone mode (a headset is used to listen to the call), a silent mode of operation wherein the second communication device detects silence from the first communication device for a predetermined duration during the call. It will be understood by a person skilled in the art that the communication system 100 of FIG. 1 has been illustrated with a number of pertinent components for exemplary purposes only. Accordingly, a plurality of communication devices 102, base stations 104, communication networks 106, carrier systems 108, a message provider module 290 and related message databases 112 may be envisaged as needed.

The communication devices 102 are in communication with one another (or other communication devices not shown) via communication network 106 and the base station 104. Accordingly, the communication network 106 may include several components such as a wireless network, a relay, a corporate server 110 and/or a mobile data server (MDS) for relaying data between the base station 104 and the carrier system 108. An example of a corporate server 110 is the BlackBerry Enterprise Server (BES) provided by Research In Motion. The communication network 106 may also be configured to support data and voice communications under the Voice over Internet Protocol (VoIP) scheme.

Communication system 100 is configured to deliver and present one or more messages to communication device 102 once a call is connected between at least two communication devices 102 and in dependence upon an occurrence of one or more pre-defined modes of operation of the corresponding communication device 102. The messages may be presented on the communication device 102 while the call is in progress and for at least as long as the device 102 is operating in at least one of the pre-defined modes. The messages may include for example, audio, video, picture or other types of multimedia messages as will be understood by a person skilled in the art. Accordingly the message may be displayed or listened to or both on an appropriate interface of the communication device. The messages may be accessed by communication device 102 either directly via the advertisement message provider module 290 or indirectly via the carrier system 108 to the communication device 102.

Referring again to FIG. 1, the carrier system 108 is coupled to the message provider module 290 having access to a message database 112. The message database 112 stores a plurality of messages thereon for access by the message provider module 290. The message provider module 290 is configured to deliver messages for presentation on a first communication device 102A when a call is connected with a second communication device 102B and a determination is made that the first communication device 102A is operating in one or more pre-defined modes of operation. In one embodiment, the presented visual message is displayed on a display screen (i.e. display screen 222 shown in FIG. 2). Note that the communication devices 102A and 102B are also referred to generally as communication devices 102 herein. The pre-defined mode of operation includes any one of: a speaker phone mode of operation, a headset mode of operation, and a silent mode of operation wherein the second communication device 102 detects silence from the first communication device for a pre-determined duration during the call. As will be described, in one embodiment, the pre-defined mode of operation further comprises a conference call mode indicating that a conference call is connected between three or more communication devices 102. Alternately, the conference call mode refers to when the communication device 102 is in communication with a conference call concentrator (such as Alcatel-Lucent™ eDial, conferencing websites such as actconferencing.com).

In one aspect, the pre-defined mode of operation indicates that the first communication device 102A is using a speaker phone (i.e. a speaker phone mode of operation). In this aspect, the speaker phone may be located internally within device 102 (i.e. as speaker 234 in FIG. 2) or the communication device 102 may be connected to an external speaker coupled to the first communication device 102 for broadcasting sound received from the second communication device 102. For example, the external speaker may include a Bluetooth® speaker installed in a vehicle for use with the communication device 102. In another aspect, the pre-defined mode of operation indicates that the first communication device 102 is operating in a headset mode of operation. The headset mode of operation refers to a user of the device 102 using a headset during the call (this includes a headset connected directly to the device 102 or a wireless headset connected to the device 102 such as via a Bluetooth® connection). In a further aspect, the pre-defined mode of operation comprises a silent mode of operation wherein the second communication device detects silence from the first communication device for a pre-determined duration during the call. In this case, the silent mode of operation may indicate for example, that the first communication device 102 is in mute status or that the user of the first communication device 102 has been silent for a pre-determined time period.

In one aspect, one or more messages may be downloaded by the communication device 102 as desired (e.g. via the web browser of the communication device 102) and stored on the communication device 102 for use as permitted messages. That is, the user may browse one or more web pages associated with message provider module 290 to select and download certain messages or categories of messages to be displayed when a call is in progress and the communication device 102 is operating in at least one of the pre-defined modes of operation. Alternately, it is contemplated that messages may be accessed indirectly or provided by a web based networked server device 110 having access to a message database 112. In yet another embodiment, not shown, the messages may be accessed by a wired desktop or laptop computer networked to message database 112, and later downloaded to communication device 102, when the latter is connected to the wired desktop or laptop computer. In yet a further embodiment, the messages may be pre-stored on a memory of the device 102 (i.e. flash memory 224 or random access memory 226 as provided in FIG. 2) for subsequent access thereof.

It will be appreciated by a person of ordinary skill in the art that the communication system 100 described herein is exemplary and that changes may be made to one or more components to accommodate different network configurations without affecting the scope of the disclosure herein. Further, although the present description specifically recites a communication device 102, it will be appreciated that other types of devices, including both wired and wireless devices, may be employed.

Figure 2:
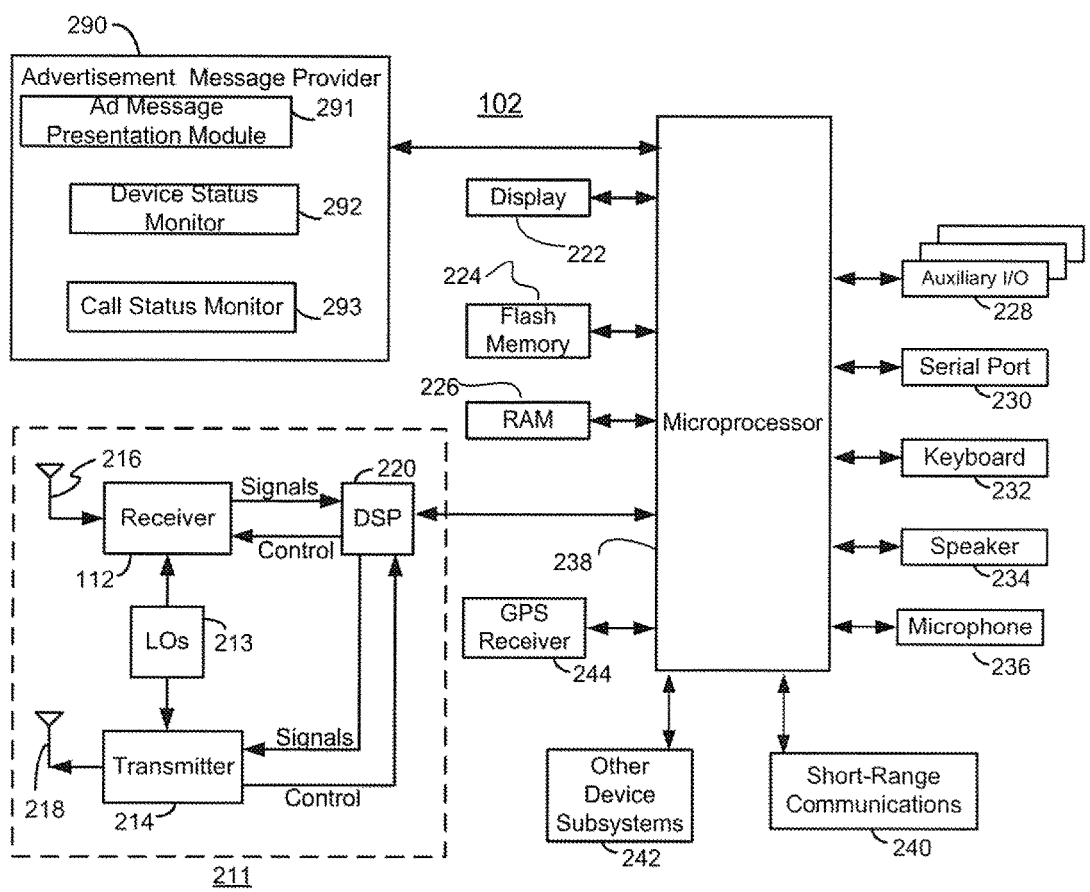
FIG. 2 is an exemplary block diagram of the communication device of FIG. 1.

Referring to FIG. 2, components of the communication device 102 are illustrated in greater detail. The communication device 102 may be a two-way communication device having both voice and data communication capabilities, including the capability to communicate with other computer systems. Depending on the functionality provided by the communication device 102, it may be referred to as a data messaging device, a two-way pager, a cellular telephone with data messaging capabilities, a wireless Internet appliance, or a data communication device.

The communication device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which communication device 102 is intended to operate.

The communication device 102 includes a microprocessor 238 which controls general operation of the communication device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The communication device 102 may also include a positioning device 244, such as a GPS receiver for example, for receiving positioning information.

Operating system software used by the microprocessor 238 may be stored in a persistent store of memory such as the flash memory 224, which may alternatively be a read-only memory (ROM) or similar storage element (not shown). Those skilled in the art will appreciate that the operating system, specific device applications, or parts thereof, may be temporarily loaded into a volatile store of memory such as RAM 226.

The microprocessor 238, in addition to its operating system functions, typically enables execution of software applications on the communication device 102. A predetermined set of applications, which control basic device operations, is installed on the communication device 102 during its manufacture. These basic operations typically include data and voice communication applications, for example.

Additionally, applications may also be loaded onto the communication device 102 through the network 106, an auxiliary I/O subsystem 228, serial port 230, short-range communications subsystem 240, or any other suitable subsystem 242, and installed by a user in RAM 226, or the persistent store 224, for execution by the microprocessor 238. Such flexibility in application installation increases the functionality of the communication device 102 and may provide enhanced on-device features, communication-related features, or both.

In one embodiment, the display screen 222 is used to visually present an application's graphical user interface (GUI) to the user. The user can manipulate application data by modifying information on the GUI using an input device such as the keyboard 232 for example. Depending on the type of communication device 102, the user may be provided with other types of input devices, such as, for example, a scroll wheel, trackball, light pen or touch sensitive display screen.

Referring again to FIG. 2, the communication device 102 further includes a message provider module 290. As described earlier, the message provider module 290 may be configured to retrieve messages from the message database 112 as needed or messages may be pre-loaded and stored onto the memory (i.e. flash memory 224 or RAM 226) of communication device 102 for subsequent access. The message provider module 290 may be a software solution that is included as part of the operating system or as an application of the communication device 102.

Referring again to FIG. 2, the message provider module 290 comprises an ad message presentation module 291, a device status monitor 292, and a call status monitor 293. A user, using communication device 102 (i.e. of a first communication device 102A) in a phone mode, may initiate an action to call a recipient phone number (i.e. of a second communication device 102B). Note that the first communication device 102A and second communication device 102B are also referred to generally as communication device 102 herein. The call status monitor 293 is configured for determining the connectivity status of the call as determining when a call is connected between the first communication device 102A and the second communication device 102B. The call status monitor 293 is further configured for determining when a call is terminated between the first communication device 102A and the second communication device 102B. The device status monitor 292 is configured for determining when the communication device 102 is operating in at least one pre-defined mode of operation. As described earlier, the pre-defined mode of operation can include any one of: a speaker phone mode of operation, a headset mode of operation, a silent mode of operation, a conference call mode of operation and any combinations thereof. Once the call status monitor 293 detects that the pre-defined mode of operation has occurred, the call status monitor 293 communicates with the ad message presentation module 291 to provide notification of same (i.e. may be done by sending a trigger notification from the device status monitor 292 to the ad message presentation module 291). Upon receiving notification that the communication device 102 is operating in at least one of the pre-defined modes of operation, the ad message presentation module 291 retrieves a pre-determined message from a memory (i.e. flash memory 224, random access memory 226, and/or external database 112) or from a networked server containing the messages and presents the message on the device 102. In one embodiment, the ad message presentation module 291 displays the message on the display screen 222 of the device 102. In another embodiment, the message comprises audio (or an audio component) and the ad message presentation module 291 is configured to play the message for output on the speaker 234. In yet another embodiment, the message comprises both audio and a display portion (i.e. a video or a picture message) for respective output on the display screen 222 and the speaker 234. In one aspect, the pre-determined message may be associated with the user, call statistics (such as recipient phone number dialed), etc.

Accordingly, once a call is connected between two communication devices 102 (i.e. communication device 102A and 102B), and the communication device (i.e. 102A) is operating in the pre-defined mode of operation, the ad message presentation module 291 is configured to present the retrieved message on the communication device 102. As described, presenting the message may include displaying the message on the display screen 222 of the communication device (i.e. 102A). In an alternate embodiment, the ad message presentation module 291 is configured to display the message on an external display screen located external to the communication device. The external display may include for example, a display associated with a Bluetooth® speaker coupled to the communication device.

Accordingly, the message presentation module 291 of the message provider module 290 may be configured to retrieve messages from the message database 112 as needed or messages may be pre-loaded and stored onto the memory, i.e. flash memory 224 or RAM 226 of communication device 102). In one embodiment, the messages may then be displayed on screen 222 of communication device 102 once a user is engaged in a call and is operating the device 102 in the pre-defined mode of operation.

In one embodiment, when the call connection is terminated (i.e. a user hangs up the call), the call status monitor 293 may provide a trigger for terminating the presentation of the message on the communication device 102 (i.e. display of the message on the display 222 by message presentation module 291). In another embodiment, the message may continue to be presented on the device after a call has ended. In yet another embodiment, the message once presented, may be selected for hearing/viewing at a later time.

In yet another embodiment the message provider module 290 is configured to allow the presented message to be stopped (or paused) by a user via the user interface of the communication device 102 and the message may be selected for presentation at a later pre-defined time. In one aspect, a user of the device when presented with the message by the message provider 290 may select to "snooze" the message and view the message later. In one aspect, the message provider module 290 is configured to provide one or more of the following options on the display 222: "snooze" the message for later access; viewing the message again; skipping the message to go to a next message; deleting the message or allowing selection of a message via the user interface of the device 102 for providing further information thereon. In another aspect, the message provider module 290 is further configured to provide reminders for viewing the message at a later time.

Further, in one embodiment, when the device 102 is no longer operating in the pre-defined mode of operation, the device status monitor 292 may provide a trigger for terminating the display of the message on the display 22 by the message presentation module 291. In one example, if a user of device 102 disconnects or otherwise turns off a headset from the device 102 (i.e. no longer operating in headset mode) the display of the message on the display 22 by message presentation module 291 is terminated. In another example, if the user of device 102 turns off the speaker phone feature on the device 102 (i.e. no longer operating in speaker phone mode) then the display of the message on the display 22 (or other presentation of the message on the device 102) by message presentation module 291 is terminated. In another example, if the user of device 102 starts talking after a period of silence or if the user de-activates the mute status of the call (i.e. no longer operating in silent mode) then the display of the message on the display 22 by message presentation module 291 is terminated. In another example, if any one of the users of device 102 disconnect from the conference call between the devices such that a conference call no longer exists, then the display of the message on the display 22 by the message presentation module 291 is terminated.

In one exemplary embodiment, the ad message presentation module 291 is further configured to continue displaying the message on the display screen 222 until the device status monitor 292 provides an indication that the device 102 is not operating in any pre-defined mode of operation. For example, a device 102 may be operating in more than one pre-defined mode of operation during the call. That is, the device 102 may be on speaker phone and on a conference call. In this example, the ad message presentation module 291 is configured to display the message during the call until both the conference call status no longer exists and the user de-activates the speaker phone feature. Although, the above examples discussed displayable messages (such as video, or text, or picture), it will be understood that other types of messages such as audio messages or messages containing an audio component that are presented on a device upon detecting a pre-determined mode may also be terminated once one or more pre-determined modes has stopped occurring.

Figure 3:
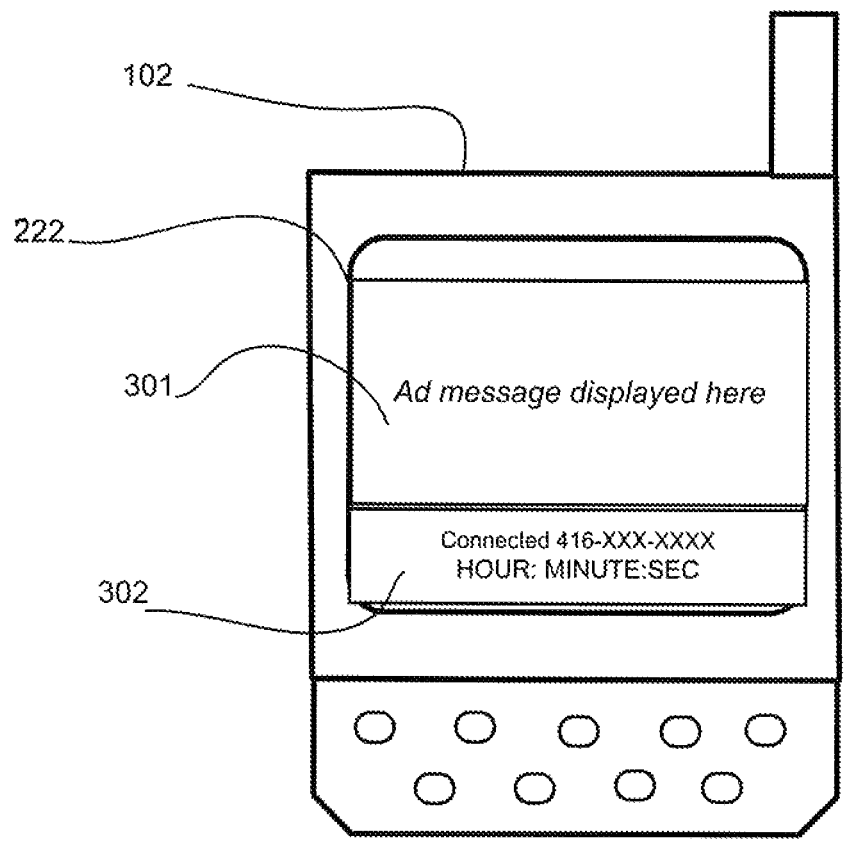
FIG. 3 is an exemplary diagram of the communication device of FIG. 1 for delivering and presenting messages in dependence upon detecting an occurrence of a pre-defined mode of operation of the communication device.

Referring to FIG. 3, shown is an exemplary diagram of the communication device 102 of FIG. 1 configured for delivering and displaying messages. Once a call is made and connected to a recipient phone number, a respective message, such as an advertising logo, may be displayed in message portion 301 of display screen 222. The respective message may be associated with for example, any one of the destination phone number, the phone number of the device 102 placing the call, the location of the device 102, the user of the device 102 or any other pre-defined criteria and combinations thereof as understood by a person skilled in the art.

Message portion 301 of display screen 222 may incorporate use of a different display style from portion 302 of display screen 222 where the recipient phone number is being displayed, such as special text colors or background colors, and font types or styles optionally coupled with audible patterns, intended to capture and maintain the user's attention, without regard to the degree of intrusiveness to the user.

Figure 4:
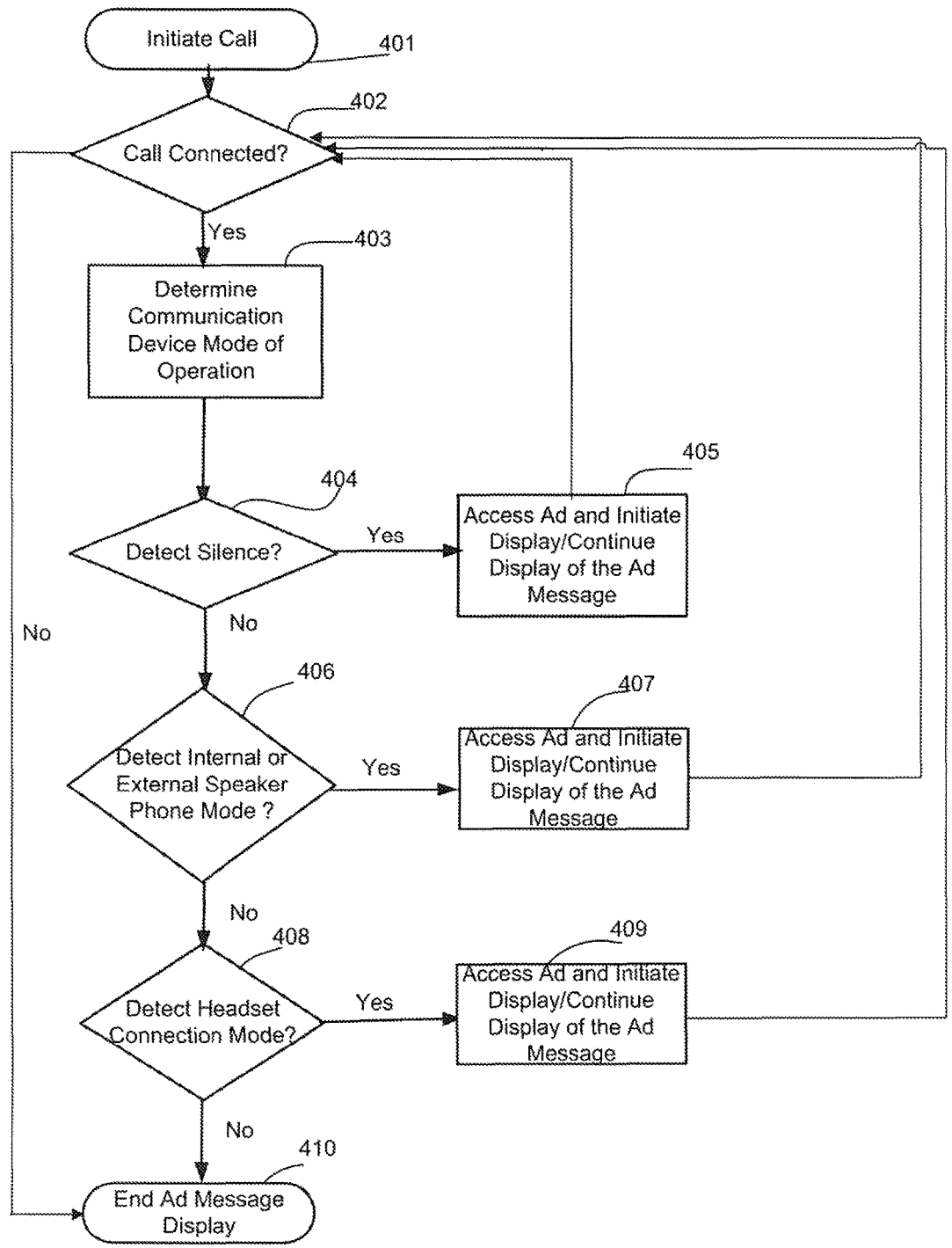
FIG. 4 illustrates an exemplary flow of interactions among components of the system of FIG. 1 for delivering and presenting messages on a communication device in dependence upon determining the communication device mode of operation in accordance with an embodiment.

FIG. 4 illustrates an exemplary flow of interactions among components of the system of FIG. 1 for delivering and displaying messages on communication device 102, in accordance with one embodiment. At step 401, a user of communication device 102 initiates a call to an intended recipient's phone number.

At step 402, the call status monitor 293 determines whether the call has been connected. Accordingly, call connection status is monitored by call status monitor 293. Call status monitor 293 of communication device 102 provides an indication of the call status of the attempted call connection with the recipient phone number being called. If the call status monitor 293 provides an indication that the call with the recipient phone number is connected then at step 403, the device status monitor 292 determines whether the communication device 102 is operating in any of the pre-defined modes of operation as provided at steps 404, 406, 408 and 502. At step 404, the device status monitor 292 determines whether the device 102 is operating in a silent mode. As described above, the silent mode may comprise, the device 102 operating in mute status or the user of the device 102 being silent for a pre-defined amount of time. If the device status monitor 292 detects that the device 102 is operating in silent mode, the message presentation module 291 accesses a message and initiates display of the message on message display portion 301 of display 222 in communication device 102 at step 405.

At step 406, the device status monitor 292 determines whether the user of the device 102 is using either one of an internal or external speaker phone associated with the device 102 on the call. If the device status monitor 292 detects that the device 102 is operating in speaker phone mode, the message presentation module 291 accesses a message and initiates display of the message on message display portion 301 of display 222 in communication device 102 at step 407.

At step 408, the device status monitor 292 determines whether the user of the device 102 is using a headset associated with device 102 during the call. If the device status monitor 292 detects that the device 102 is operating in headset mode, the message presentation module 291 accesses a message and initiates display of the message on message display portion 301 of display 222 in communication device 102 at step 409.

The message accessed by the message presentation module 291 may comprise an advertising message or an emergency notification message or any other message that may be customizable/pre-defined for the device 102, for example.

At step 410, if the device status monitor 292 determines that the device 102 is not operating in any of the pre-defined modes of operation or that the call has been terminated (i.e. as a trigger provided by the call status monitor 293), then the message presentation module 291 terminates the display of the message on the display screen 222. In another embodiment discussed above, the message presentation module 291 is configured to continue the display of the message even after the call is terminated.

It will be understood that although the embodiment discussed in FIG. 4 refers to displayable messages for display on the communication device 102, the method steps related to FIG. 4 are also applicable to the presentation of audio messages (or messages containing an audio component such as video messages) on the device 102. That is, in the present embodiment, the device status monitor 292 detects that the device 102 is operating in a pre-defined mode and the message presentation module 291 accesses a message and initiates presentation of the message on a speaker 234 of communication device 102.

Figure 5:
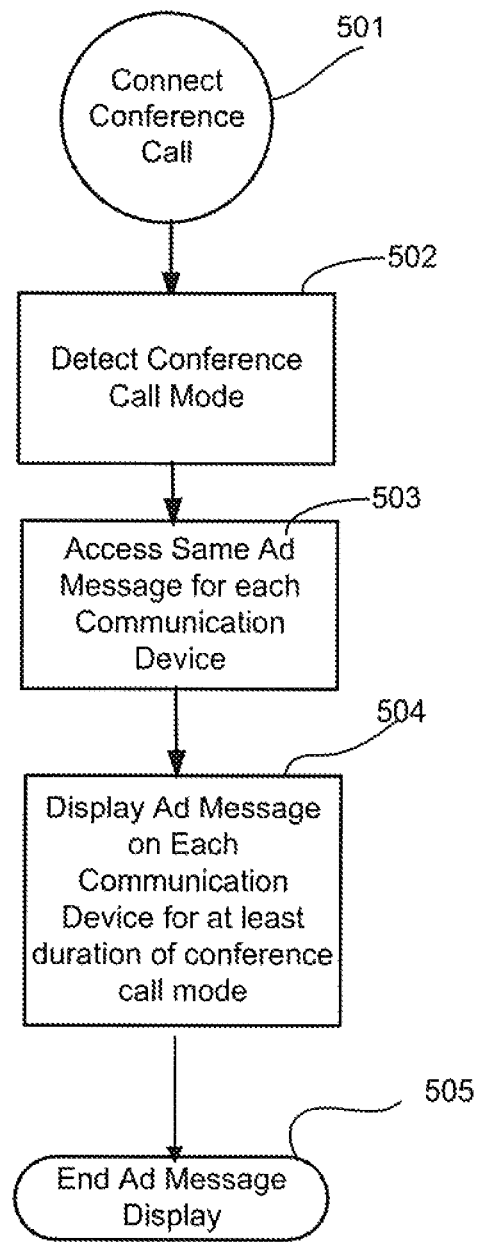
FIG. 5 illustrates another variation of the exemplary flow of interactions among components of the system of FIG. 1 in accordance with an embodiment.

FIG. 5 illustrates a variation of the exemplary flow of interactions of FIG. 4. At step 501, a call is connected between multiple communication devices 102. At step 502, the device status monitor 292 detects that the device 102 is operating in a conference call mode. At steps 503 and 504, the ad message presentation module 291 is configured to retrieve and display a same message on each of the communication devices 102 involved in the conference call. For example, the message presentation module 291 on each device 102 involved in the conference call may be configured to communicate with each other and to retrieve and display the same message on each device 102. At step 505, the call status monitor 293 determines that the call has been aborted and at step 506, the message presentation module 291 ends the display of the message on the screen(s) 222 of communication devices 102. Alternately, the message presentation module 291 may be configured to continue the presentation of the message after the call is terminated, for example until the message has completed. Further alternately, a user may interact via the user interface of the device 102 for pausing the presentation of the message and selecting a later viewing of the message by the message presentation module 291.

In accordance with an alternate embodiment, once a conference call mode is detected, the ad message presentation module 291 is configured to retrieve a plurality of messages for display on each of the communication devices 102 involved in the conference call. The plurality of messages may be pre-selected for display on the screen 222 of each of the devices 102. The message presentation module 291 may further be configured to display each of said plurality of messages on the corresponding display screen. In one embodiment, the message is displayed until an indication of termination of the conference call connection status is received.

It will be understood that although the embodiment discussed in reference to FIG. 5 refers to visual messages for display on screen(s) 222 of the communication device 102, it will be understood that other types of messages (such as audio messages or messages containing at least an audio component) may equally be presented on a plurality of communication devices 102 during a detection of a conference call mode of operation.

In one embodiment, the message described herein may comprise, for example, an advertisement message or an emergency alert, with a hypertext link provided for directly connecting to the source or sponsor of the advertisement or emergency alert. Other types of connections with the source of the message are contemplated. For example, the user may be presented with a hypertext link via a web browser of communication device 102, to establish an on-line Internet-based connection.

Although various embodiments have been described in the disclosure herein, it will be understood by those skilled in the art that further variations may be made without departing from the scope of the appended claims.

What is claimed is:

1. A computer implemented method for delivery and presentation of a message on a first communication device, the method comprising:
   receiving a call connection status indication associated with connecting a call between the first communication device and a second communication device;
   detecting, during the call, occurrence of a mode of operation of the first communication device; and,
   when the mode of operation is a silent mode of operation, wherein the silent mode of operation occurs when either a duration of silence of the first communication device exceeds a predetermined duration or when the first communication device is operating in a mute status for at least a portion of a duration of the call, and when the mode of operation is one of either a speaker phone mode of operation or a headset mode of operation, accessing the message stored in a memory and presenting the message on the first communication device during the call responsive to said detecting the occurrence of the mode of operation,
   wherein detecting the occurrence of the speaker phone mode of operation comprises detecting use of at least one of an internal speaker located on the first communication device and an external speaker coupled to the first communication device, each of the internal speaker and the external speaker for broadcasting sound received from the second communication device during the call, and wherein detecting the occurrence of the headset mode of operation during the call comprises detecting use of a headset coupled to the communication device during the call.

2. The method of claim 1 further comprising continuing the presentation of the message until at least one of an indication of termination of the call is received and the mode of operation has ended.

3. The method of claim 1, wherein comprising displaying the message on a display screen associated with the external speaker.

4. The method of claim 1, wherein the mode of operation further comprises a conference call mode of operation and wherein detecting the occurrence of the mode of operation further comprises:

receiving a conference call connection status indication associated with connecting the call with at least one other communication device; and presenting the message further comprises causing presentation of a same message on each of the second communication device and the at least one other communication device in response to the conference call connection status indication.

5. The method according to claim 4, further comprising continuing the presentation of the message for until at least one of: an indication of termination of the call is received and the selected mode has ended.

6. The method of claim 4 wherein the message is stored in a memory of a networked server device.

7. The method of claim 1, wherein detecting the occurrence of the mode of operation further comprises:

receiving a conference call connection status indication associated with connecting the call with at least one other communication device;

accessing a plurality of messages stored in the memory, each of the plurality of messages pre-selected for presentation on a corresponding interface of each of the second communication device and the at least one other communication device; and presenting each of the plurality of messages on the corresponding interface in response to the received conference call connection status indication.

8. The method of claim 1 wherein the message is stored in a memory of the communication device.

9. The method of claim 1 wherein the message is stored in a memory of a networked server device.

10. The method of claim 1 wherein the message comprises an advertising message.

11. The method of claim 1 wherein the message comprises at least one of an audio message, a video message, a picture message, and a textual message.

12. The method according to claim 1, further comprising providing a user interface configured to allow selection of a time for presenting the message.

13. A non-transitory computer program product storing instructions and data to configure a processor to:

receive a call connection status indication associated with connecting a call between a first communication device and a second communication device;

detect occurrence of a mode of operation of the first communication device during the call; and, when the mode of operation is a silent mode of operation, wherein the silent mode of operation occurs when either a duration of silence of the first communication device exceeds a predetermined duration or when the first communication device is operating in a mute status for at least a portion of a duration of the call, and when the mode of operation is one of either a speaker phone mode of operation or a headset mode of operation, access the message stored in a memory and presenting the message on the first communication device during the call responsive to said detecting the occurrence of the mode of operation, wherein detecting the occurrence of the speaker phone mode of operation comprises detecting use of at least one of an internal speaker located on the first communication device and an external speaker coupled to the first communication device, each of the internal speaker and the external speaker for broadcasting sound received from the second communication device during the call, and wherein detecting the occurrence of the headset mode of operation during the call comprises detecting use of a headset coupled to the communication device during the call.

14. A communication device for presenting a message, the communication device comprising: a processor and a memory coupled thereto, the memory storing instructions and data configuring the processor to:

receive a call connection status indication associated with connecting a call between the communication device and a second communication device;

detect occurrence of a mode of operation of the communication device during the call; and, when the mode of operation is a silent mode of operation, wherein the silent mode of operation occurs when either a duration of silence of the first communication device exceeds a predetermined duration or when the first communication device is operating in a mute status for at least a portion of a duration of the call, and when the mode of operation is one of either a speaker phone mode of operation or a headset mode of operation, access the message stored in a memory and presenting the message on the communication device during the call responsive to said detecting the occurrence of the mode of operation, wherein detecting the occurrence of the speaker phone mode of operation comprises detecting use of at least one of an internal speaker located on the first communication device and an external speaker coupled to the first communication device, each of the internal speaker and the external speaker for broadcasting sound received from the second communication device during the call, and wherein detecting the occurrence of the headset mode of operation during the call comprises detecting use of a headset coupled to the communication device during the call.

15. The communication device of claim 14, wherein the communication device is a wireless handheld communication device.

16. A computer implemented system for delivering and presenting a message on a communication device, the system comprising:

a processor and a memory coupled thereto, the memory storing instructions and data configuring the processor to control or execute:

a call status monitor for receiving a call connection status indication associated with connecting a call between the communication device and a second communication device;

a device status monitor for detecting occurrence of a mode of operation of the communication device during the call; and, a message presentation module configured to, responsive to said detecting the occurrence of the mode of operation, access the message from a memory location, and to initiate presentation of the message on the communication device upon receiving the call connection status when the mode of operation is a silent mode of operation, wherein the silent mode of operation occurs when either a duration of silence of the first communication device exceeds a predetermined duration or when the first communication device is operating in a mute status for at least a portion of a duration of the call, and when the mode of operation is one of either a speaker phone mode of operation or a headset mode of operation, wherein detecting the occurrence of the speaker phone mode of operation comprises detecting use of at least one of an internal speaker located on the first communication device and an external speaker coupled to the first communication device, each of the internal speaker and the external speaker for broadcasting sound received from the second communication device during the call, and wherein detecting the occurrence of the headset mode of operation during the call comprises detecting use of a headset coupled to the communication device during the call.

17. The system of claim 16 wherein the message presentation module is further configured to present the message at least until one of the call status monitor indicates the call has terminated and the mode of operation has ended.

18. The system of claim 16, wherein the message presentation module is configured to access a message stored in a memory of the communication device.

19. The system of claim 16, wherein the message presentation module is configured to access a message stored in a memory of a networked server device.

20. The system of claim 16, wherein the device status monitor is further configured to detect occurrence of a conference call mode of operation associated with connecting the call with at least one other communication device; and the message presentation module is further configured to present a same message on each of the second communication device and the at least one other communication device in response to the conference call mode of operation.

21. The system of claim 16, wherein the message comprises an advertising message preselected for display on the communication device.

* * * * *